Feb. 22, 1944. G. A. RUBISSOW 2,342,302
PART BEARING
Filed Oct. 25, 1941
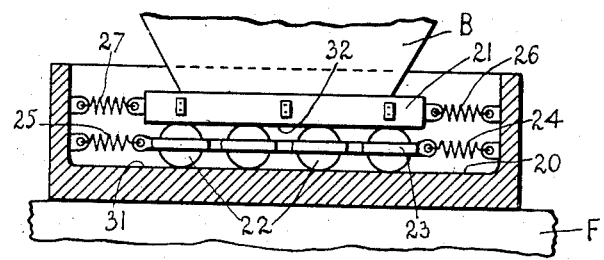
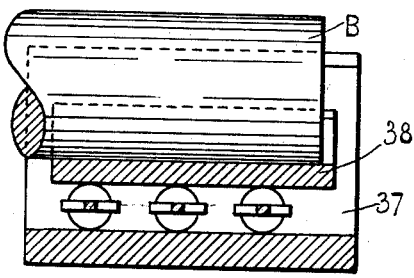
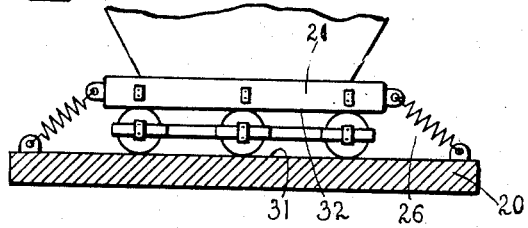
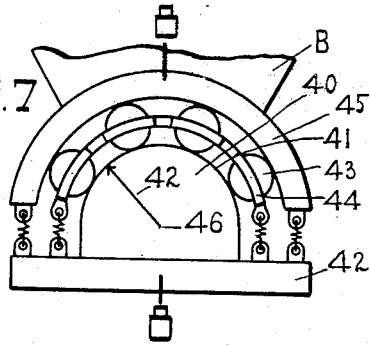
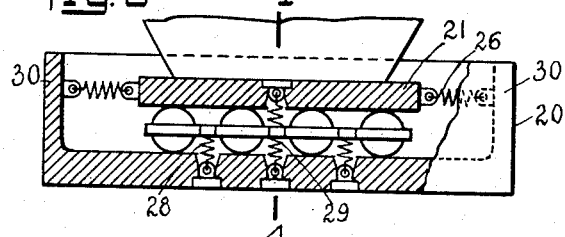
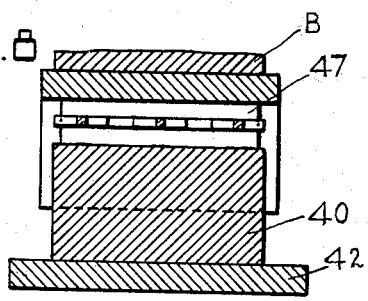
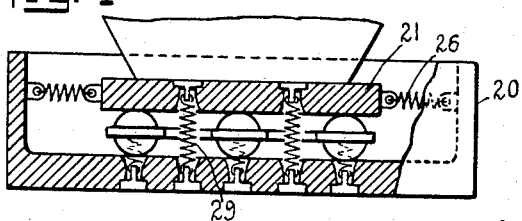
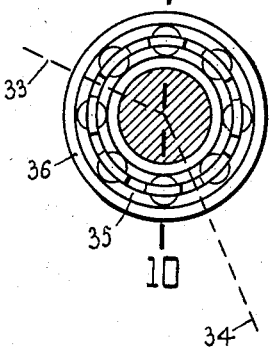
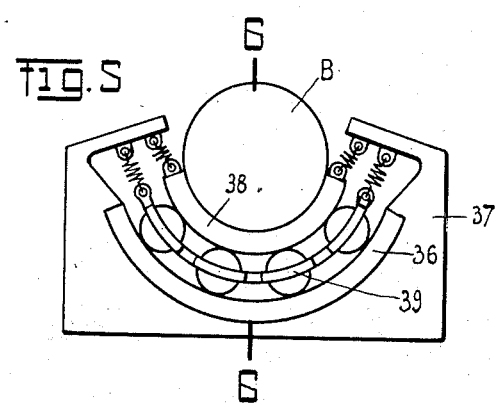
INVENTOR.
George A. Rubissow.

Patented Feb. 22, 1944

2,342,302

UNITED STATES PATENT OFFICE 2,342,302

PART BEARING

George A. Rubissow, New York, N. Y.

Application October 25, 1941, Serial No. 416,486

2 Claims. (Cl. 308—177)

Means such as bushings, bearings, ball-bearings and the like for diminishing the friction between them and the rotating parts such as axles, pins, shafts and other like rotating parts which are mounted therein, must all have their inner periphery a continuously circular bearing surface. This type of bearing or bushing may only serve for rotatable parts.

This invention provides a new type of bearing which may be used for bodies, elements, or machine parts that pivot or slide to and fro one in relation to the other, or one in relation to the base or foundation.

The above and further objects and novel features will be more fully apparent from the following detailed description when the same is read in connection with the accompanying drawing. It is to be expressly understood, however, that the drawing is for purpose of illustration only, and is not intended as a definition of the limits of the invention.

In the drawing wherein like reference characters refer to like parts throughout the several views, Figures 1, 2, 3 and 4 are schematical side-views partly in cross-section of one embodiment of this invention.

Figure 5 is a side-view of another embodiment of this invention.

Figure 6 is a sectional side-view 6—6 of Figure 5.

Figure 7 is a side-view of another embodiment.

Figure 8 is a cross-sectional side-view 8—8 of Figure 7.

Figure 9 is a plan-view of a bearing illustrating the method of how part bearings are produced therefrom.

Figure 10 is a cross-sectional side-view 10—10 of Figure 9.

It is frequently found necessary to move one body or machine part in relation to another body such as the base, for only a small space. To reduce the friction, orthodox bearings are generally employed, and one body is provided with axles on which said bearing is mounted, operatively interconnected with the other body or rolling thereon. Such an arrangement always necessitates a shaft and complete bearing.

Figure 1 shows the body B which is moved in relation to the base F. The device consists of the support-base member 20 and the supported member 21, between which is interposed at least one, but preferably a plurality of rolling elements 22. The rolling elements 22 may be either cylinders, needles or balls, or they may be ellipses or barrels, according to the shape of the runways on which they roll. For simplicity of the description, the figures on the drawing show rollers or balls. The rolling elements may be interconnected by means of a mounting 23. This mounting may be provided with resilient means 24 and 25 to keep the mounting in a predetermined position. The supported member 21 may also be provided with resilient means 26 and 27 attached to the support-base member 20. The resilient means 24 and 25 instead of being attached to the support-base 20 may be attached directly to the member 21. If the body B which may be a machine element or part has to be moved to and fro, it may do so with substantially no friction except for that created by the rolling, due to the fact that the member 21 rolls simultaneously on the support-base 20.

Figures 2, 3, and 4 show different forms of attachment of the supported member 21 to the support-base 20, i. e., by resilient means 26 as shown on Figure 2, or 28 and 29 as shown on Figure 3. The rolling elements may be mounted in the ordinary manner employed in the bearing industry for balls, needles or rollers.

Base 20 may be a plate, as shown on Figure 2, or have flanges 30 as shown in Figure 3, or be of any other desirable shape or form. It is essential that the runways 31 and 32 on which the rolling elements roll, are parallel.

This very economical device provides facility for the to and fro sliding movements of machine parts or heavy bodies mounted through the intermediary of the flat level part-bearing device described herein.

Figures 5, 6, 6 and 8 show another very important circular segment-bearing device. The method of manufacturing this device in all its various embodiments is very simple. The existing orthodox bearing device as shown on Figures 9 and 10 may be cut into segments along the lines 33 and 34, for example. This will obtain a segment 35 as illustrated on Figures 5 and 6, wherein the support-base member 36 may, if desired, be mounted on a second support-base member 37, or constitute one solid unit. The supported member 38 or the mounting 39 may be attached by resilient means to each other, or one or both may be attached to the support-base 36 or 37. This attachment maintains the support and the supported member, the rollers and the mounting in a predetermined position while inoperative.

Figure 6 shows a three-row ball-bearing system.

Figure 7 shows another type of circular segment-bearing wherein the support-base 40 has a runway 41 which is a part of a circle formed by the radius 42. This track or runway forms one rigid part in relation to the base 42. The rolling element 43 mounted through the intermediary of member 44 rolls simultaneously on the member 45 on which the body B is affixed. When body B pivots or oscillates around the center 46 the balls 43 begin to roll accordingly.

Figure 8 shows cylinders 47 instead of balls 43 as illustrated on Figure 7.

This invention offers great economical and commercial value inasmuch as two or three part-bearings may be made from each orthodox circular bearing having rolling elements, by cutting them accordingly into three or four parts. Part-bearings eliminate the necessity of providing the axis and the necessary space around it, and for this reason alone, represents an economy over present-day usages.

Having now ascertained and particularly described the nature of the said invention and the manner in which it is to be performed, I declare that what I claim is:

1. A part-bearing comprising a support-base member, a supported member, each of said members having a non-continuous limited arcuate runway, at least two rolling elements interposed between the said two runways and able to roll limitedly to and fro, said rolling elements contacting simultaneously both of the said runways while one of the said members is moved to and fro, resilient means provided to operatively interconnect the said members, the rolling longitudinal surface of one of the said runways being a part of a circle and the rolling surface of the said other runway being a part of another circle, said circles being co-axial and the difference in radii being equal to the diameter of the said rolling elements.

2. A part-bearing comprising a support-base member, a supported member, each of said members having a non-continuous limited arcuate runway, at least two rolling elements interposed between the said two runways and able to roll limitedly to and fro, said rolling elements contacting simultaneously both of the said runways while one of the said members is moved to and fro, a mounting being provided to maintain the said rolling elements in a predetermined relative position one in respect to the other while rolling, resilient means operatively interconnecting said mounting with at least one of the said members, the rolling longitudinal surface of one of the said runways being a part of a circle and the rolling surface of the said other runway being a part of another circle, said circles being co-axial and the difference in radii being equal to the diameter of the said rolling elements.

GEORGE A. RUBISSOW.